Dec. 1, 1970    S. GILES    3,544,852
SOLID ELECTROLYTE ELECTROCHEMICAL TIMER HAVING A
RELATIVELY STABLE PRESTRESSED CONDITION
Filed June 27, 1968

INVENTOR.
STUART GILES
BY
Donald J. Ellingsberg

United States Patent Office 3,544,852
Patented Dec. 1, 1970

3,544,852
SOLID ELECTROLYTE ELECTROCHEMICAL TIMER HAVING A RELATIVELY STABLE PRESTRESSED CONDITION
Stuart Giles, Woodland Hills, Calif., assignor to North American Rockwell Corporation
Filed June 27, 1968, Ser. No. 740,632
Int. Cl. H01g 9/05, 9/06
U.S. Cl. 317—230                5 Claims

ABSTRACT OF THE DISCLOSURE

An improved electrochemical timer having a plurality of timer components, which include a solid electrolyte, maintained in a relatively stable prestressed condition during timer operation to ensure improved electrical contact between the components without structural discontinuities during timer operation.

CROSS REFERENCE TO RELATED APPLICATION

Copending application S.N. 740,689 "Electrochemical Timer Having a Solid Electrolyte," Stuart Giles, filed even date herewith and assigned to the same assignee as the present invention.

BACKGROUND OF THE INVENTION

An electrochemical timer is a form of electrochemical cell that exhibits a sudden change in resistance which may be used as an output signal after the passage of a selected amount of current over an interval of time. The time can be as short as a fraction of a minute or as long as several days or weeks.

Electrochemical timers operate on the principle of Faraday's laws of electrolysis. In accordance with this principle, the passage of a constant current through an electrochtmical cell causes the material of one electrode (anode) to be ionized and replated out at a second electrode (cathode). When the plateable material is depleted at the anode, polarization occurs in the cell. This results in a voltage drop increase that is the key to using an electrochemical cell as a timer.

Electrochemical cells or timers use either a liquid or solid electrolyte. One form of electrochemical timer that uses a solid electrolyte is disclosed and claimed in a copending application S.N. 573,743, filed Aug. 1, 1966, "Solid State Electrochemical Devices," Pat. No. 3,443,-997, and assigned to the same assignee as the present invention. The solid electrolyte is disposed between two electrodes, one of which is a source electrode in a timing mode. During setting of the timer, i.e., transferring active metal from a first electrode to the source electrode to set the timer, the plateable active metal is transferred in direct proportion to the ampere-seconds applied. During the timing mode, i.e., stripping the plated metal layer from the source electrode, the current is reversed and the metal is returned to the first electrode. When the source electrode is completely depleted of plated metal, the voltage drop across the timer suddenly increases. This change in voltage can be used to trigger a functional circuit, e.g., to fire a silicon-control rectifier, or to actuate a suitable signal device, or the like.

When the electrochemical timer components including the solid electrolyte are maintained in a prestressed condition as disclosed in my copending application, there is the possibility that structural discontinuities such as fractures can occur in the timer components during timer operation under certain operating conditions. Consequently, the accuracy of the solid electrolyte electrochemical timers can be inconsistent and result in the corresponding loss of reliability to the user.

OBJECTS OF THE INVENTION

Accordingly, it is an object of the invention to provide a new and improved solid electrolyte electrochemical timer having the timer components maintained in a relatively stable prestressed condition.

It is an object of the invention to provide a solid electrolyte electrochemical timer that substantially reduces or eliminates structural discontinuities in the timer components.

It is an object of the invention to provide a solid electrolyte electrochemical timer that has improved accuracy and reliability over a wide operating temperature range.

SUMMARY OF THE INVENTION

Briefly, in accordance with the invention, a solid electrolyte electrochemical timer having the timer components maintained in a prestressed condition is provided with an improved source of plateable material that can physically move between several positions within the timer without increasing the predetermined stress value in the timer components so that a relatively stable prestressed condition is maintained during timer operation.

While the specification concludes with claims particularly pointing out and distinctly claiming the subject matter which may be regarded as the invention, the organization and method of operation together with further objects, features, and the attending advantages thereof, may best be understood when the following description is read in connection with the accompanying drawing.

DESCRIPTION OF THE INVENTION

Figure 1:
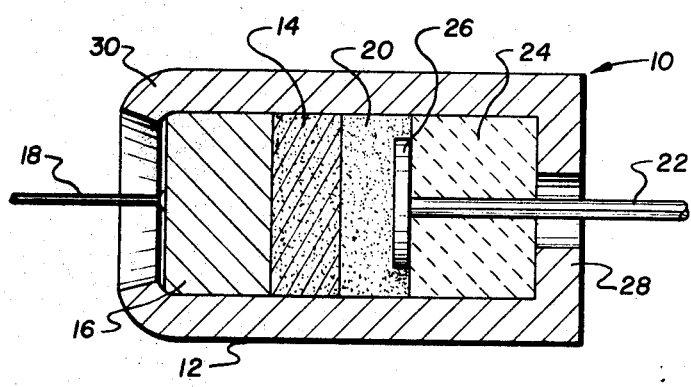
FIG. 1 is a sectional elevation of one form of prior art solid electrolyte electrochemical timer.

Referring to FIG. 1, one form of prior art electrochemical timer 10 (see my copending application as noted above) has a first electrode means that includes a container 12 which can be generally tubular and electrically conducting in the timer as shown, an electrically conducting electrode plate 14 positioned within the container, a contiguous electrode plug 16, and a first electrode lead 18 connected, by welding or the like, to the plug. The timer 10 has a solid electrolyte means in the form of an electrolyte plate 20 positioned within the container 12 and contiguous with the electrode plate 14. The timer 10 has a second electrode means in the form of a second electrode lead 22. An electrical insulator means in the form of an insulator bead 24 positions the second electrode lead 22 and maintains the headed end 26 of the second electrode lead in intimate electrical contact with the solid electrolyte plate 20. The insulator bead 24 maintains the second electrode lead 22 in a spaced-apart relationship from an inwardly directed edge or flange 28 of the container 12. The timer components, i.e., electrode plate 14, electrode plug 16, electrolyte plate 20, second electrode lead 22, and the insulator bead 24, positioned within the container 12 of the prior art electrochemical timer 10 as shown by FIG. 1 are maintained in a prestressed condition by the inwardly-swaged, lip edge 30 of the container.

Figure 2:
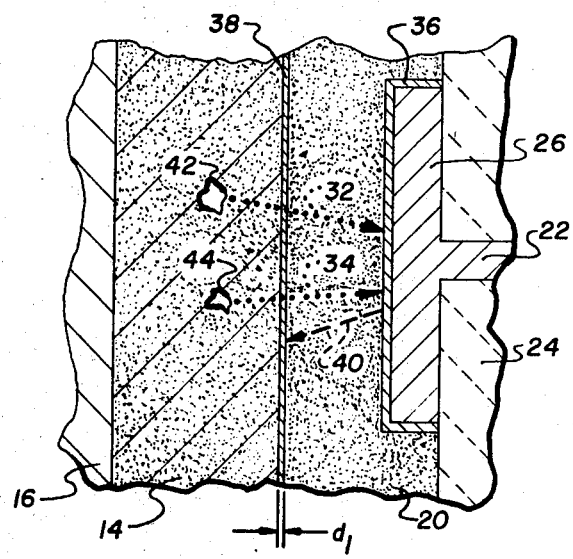
FIG. 2 is an enlarged portion of the sectional elevation of FIG. 1, partly broken away.

An electrochemical timer such as prior art timer 10 is set by passing an electrical current between the first and second electrode leads 18 and 22, respectively, as shown by FIG. 1, and the enlarged portion of the timer 10 as shown by FIG. 2. The electrode plug 16 is in electrical continuity with the first electrode lead 18 (see FIG. 1). In the set mode of timer operation, the first electrode lead 18, and thus the electrode plug 16, exhibits anode characteristics and the second electrode lead 22 exhibits cathode characteristics. When the electrode plate 14 is formed from a mixture that contains silver, the impressed voltage across the timer results in positive silver ions that migrate from the electrode plate 14 through the electrolyte plate 20 to the headed end 26 of the second electrode lead 22 along numerous migration paths such as the schematically shown migration paths 32 and 34. Electrons migrate from the electrode plate 14 through the electrode plug 16 and an external cricuit (not shown) to the headed end 26. The positive silver ions that migrate to the headed end 26 are neutralized or discharged by the negative electrons at the headed end. The product of this reaction between the silver ions and the electrons at the headed end 26 is the formation of silver atoms which plate the headed end with a metal layer 36 of silver. The thickness of the silver layer 36 on the headed end 26 of the second electrode lead 22 in the set mode is determined by the ampere-seconds applied to the timer 10.

In the timing mode, an electrical current passes through the prior art electrochemical timer 10 as shown by FIG. 2 in a reverse direction to that in the set mode as previously described. The silver layer 36 with its predetermined plated thickness on the headed end 26 becomes a source of metal that is stripped from the source electrode during the timing mode. Again, positive silver ions migrate from the silver layer 36 through the electrolyte plate 20 but these ions now plate-out as a silver layer 38 on the interface between the electrode plate 14 and the electrolyte plate 20. The positive silver ions migrate along numerous migration paths such as the schematically shown dashed migration path 40. The electrode plate 14 develops voids such as voids 42 and 44 during the set mode as shown by FIG. 2 when the positive silver ions migrate to the headed end 26 of the second electrode lead 22. Voids 42 and 44 apparently remain in the electrode plate 14 during the timing mode because the positive silver ions migrate from the silver layer 36 and plate-out on the interface between the electrode plate and the electrolyte plate 20 as the silver layer 38 rather than migrating in to the electrode plate and filling the voids. When the silver layer 36 has been depleted, i.e., the headed end 26 is substantially stripped of the plated silver metal, the voltage drop across the timer 10 suddenly increases. This sudden increase in voltage drop is used to trigger a functional circuit.

Since the prior art timer components, i.e., electrode plate 14, electrode plug 16, electrolyte plate 20, second electrode lead 22, and insulator bead 24, are maintained in a prestressed condition by the swaged lip edge 30 of the timer container 12, the silver layer 38 that results when the positive silver ions plate-out on the interface between the electrode plate 14 and the electrolyte plate 20 during the timing mode of the timer operation introduces a finite dimensional increase $d_1$ as shown by FIG. 2. This dimensional increase $d_1$ is undesirable under certain timer operating conditions because the finite dimensional increase develops an increase in the total residual stress experienced by the timer components. It is possible that under certain timer operating conditions this increased stress value could result in structural discontinuities in the timer components. For example, the insulator bead 24, which can be formed from alumina oxide ($Al_2O_3$), may fracture or be crushed; this loss in structural integrity of the insulator bead could result in an electrical short circuit between the second electrode lead 22 and the flange edge 28 of container 12 which is in electrical continuity with the first electrode lead 18 through electrode plug 16.

Figure 3:
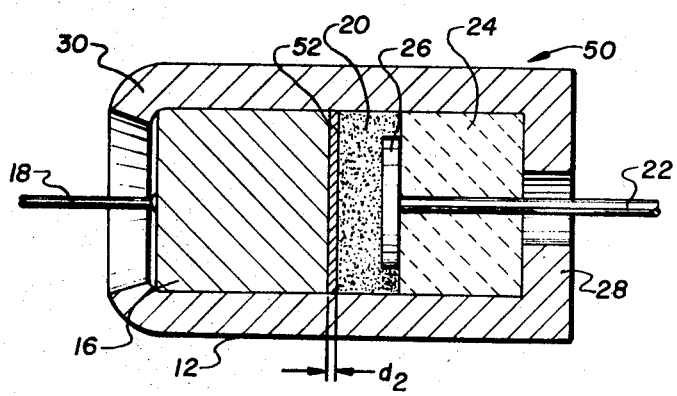
FIG. 3 is a sectional elevation of one form of solid electrolyte electrochemical timer formed in accordance with the invention.

Referring now to FIG. 3, the possible problem of structural discontinuities which can develop in prior art electrochemical timers having a solid electrolyte is substantially minimized or eliminated by the improved electrochemical timer 50 of my present invention. Like parts in each of the several figures are identified by the same reference character. Thus, timer 50 has a first electrode means that includes container 12, electrode plug 16, first electrode lead 18, and a plateable material such as siliver metal layer 52 that can be plated on the inner surface of the electrode plug, or can be a separate wafer-like silver foil positioned between the inner surface of the electrode plug and the adjacent surface of the solid electrolyte plate 20, or the like. The second electrode lead 22 and the insulator bead 24 complete the improved timer 50 of my invention. The timer components, i.e., electrode plug 16, silver layer 52, electrolyte plate 20, second electrode lead 22, and insulator bead 24, are maintained in a prestressed condition as described hereinbefore by the swaged lip edge 30 of timer container 12.

Figure 4:
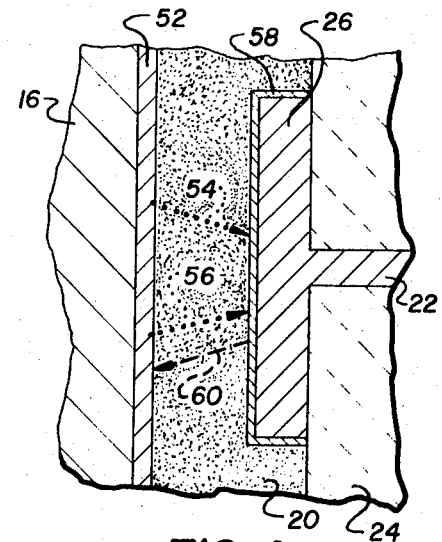
FIG. 4 is an enlarged portion of the sectional elevation of FIG. 3 during operation of the solid electrolyte electrochemical timer formed in accordance with the invention.

In the set mode of the improved electrochemical timer 50 as shown by FIGS. 3 and 4, an impressed voltage across the timer results in positive silver ions that migrate from the silver layer 52 through the electrolyte plate 20 to the headed end 26 of the second electrode lead 22 along numerous migration paths such as the schematically shown migration paths 54 and 56. Electrons migrate from the silver layer 52 through the electrode plug 16 and an external circuit (not shown) to the headed end 26. The positive silver ions that migrate to the headed end 26 are neutralized or discharged by the negative electrons at the headed end. The product of this reaction is the formation of silver atoms which plate the headed end with a silver layer 58. Again, the thickness of the silver layer 58 in the set mode is determined by th e ampere-seconds applied to the timer 50.

In the timing mode, the silver layer 58 becomes a source of metal that is stripped from the headed end 26 of the second electrode lead 22 in the timer as shown. Positive silver ions migrate from the silver layer 58 through the electrolyte plate 20 along migration paths such as the schematically shown dashed migration path 60. These silver ions plate-out at the silver layer 52.

Operatively, the improved electrochemical timer 50 as shown by FIGS. 3 and 4 develops a sudden increase in voltage drop across the timer when the silver layer 58 is depleted or substantially stripped of the plated silver metal. This sudden increase in voltage drop is used in a known manner to trigger a functional circuit.

In my improved solid electrolyte electrochemical timer 50 as shown by FIGS. 3 and 4, the finite dimension $d_2$ of the silver layer 52 is maintained within the container 12 during the set and timing modes. The silver metal that migrates from the silver layer 52 through the solid electrolyte plate 20 and plates out as the silver layer 58 during the set mode of timer operation neither increases nor decreases the total finite dimension $d_2$ since the decrease in finite thickness of silver layer 52 is countered by the increase in finite thickness of silver layer 58 so that the total finite dimension $d_2$ is constant within the timer container 12. Similarly, the total finite dimension $d_2$ remains constant during the timing mode. Consequently, the predetermined compressive load placed on the timer components by the swaged lip edge 30 is maintained as a relatively stable prestressed condition during timer operation. This stable prestressed condition substantially minimizes or eliminates the possibility of structural discontinuities during timer operation and, therefore, increases timer reliability.

As will be evidence from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:
1. An improved electrochemical timer having set and timing modes, the timer comprising:
   (a) container means adapted to retain a plurality of timer components,
   (b) first and second electrode means cooperating with said container means, and a solid electrolyte means within said container means,
   (c) electrical insulator means maintaining at least said second electrode means in an electrically nonconducting relationship with said container means,
   (d) a source of plateable material in said container means cooperating with said electrode means and electrolyte means so that said material migrates to a selected one of said first and second electrode means during the set mode of timer operation and migrates to said material source during the timing mode of timer operation thereby maintaining a constant total finite dimension,
   (e) said solid electrolyte means cooperating with said source of plateable material so that said plateable material migrates through said solid electrolyte means, in the set and timing modes, and
   (f) pressure developing means cooperating with said container means and acting upon at least said second electrode means, said source of plateable material, said solid electrolyte means for maintaining a predetermined prestressed condition in these recited at least acted upon elements unaffected by said migrating material during timer operation.

2. The electrochemical timer of claim 1 in which said source of plateable material is a layer of material plated on said first electrode means so that said layer spaces apart said first electrode means and said solid electrolyte.

3. The electrochemical timer of claim 2 in which said layer of plateable material is silver metal.

4. The electrochemical timer of claim 1 in which said source of plateable material is a foil of material interposed between said first electrode means and said solid electrolyte.

5. The electrochemical timer of claim 1 in which said plateable material migrates to said second electrode means during the set mode and to said source from said second electrode means during the timing mode.

References Cited
UNITED STATES PATENTS

| | | | |
|---|---|---|---|
| 2,710,369 | 6/1955 | Booe | 317—230 |
| 3,423,648 | 1/1969 | Mintz | 317—231 |
| 3,443,997 | 5/1969 | Argue et al. | 136—153 X |

JAMES D. KALLAM Primary Examiner

U.S. Cl. X.R.
317—231